United States Patent Office 3,567,723
Patented Mar. 2, 1971

3,567,723
**TERTIARY AMINOALKYL PENTACHLORO-
PHENYL ETHERS**
Shigeo Seki, Tokyo, and Tomio Matsuni, Yokohama-shi,
Japan, assignors to Meiji Seika Kaisha, Ltd., Tokyo,
Japan
No Drawing. Filed May 17, 1967, Ser. No. 639,063
Claims priority, application Japan, May 21, 1966,
41/32,063
Int. Cl. C07d 87/32
U.S. Cl. 260—247.7          6 Claims

ABSTRACT OF THE DISCLOSURE

Alkylaminoalkyl pentachlorophenyl ethers represented by the general formula:

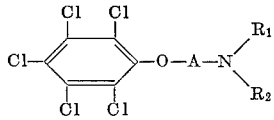

wherein A stands for a chain selected from the group consisting of ethylene, trimethylene and propylene

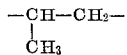

and $R_1$ and $R_2$ are selected from the group consisting of alkyl and aralkyl radicals but both of $R_1$ and $R_2$ cannot represent ethyl radical simultaneously; and $R_1$ and $R_2$ together with the adjacent nitrogen atom may form a heterocyclic ring selected from the group consisting of pyrrolidine, piperidine and morpholine, which are new and useful as fungicide.

A process for the production of alkylaminoalkyl pentachlorophenyl ethers of the above-mentioned general formula which comprises reacting an excess of an alkali metal salt of pentachlorophenol with a hydrohalogenic acid salt of an alkylaminoalkyl halide of the formula:

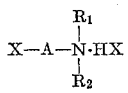

wherein A, $R_1$ and $R_2$ have the same meanings as defined above, respectively and X stands for a chlorine or bromine, in a solvent consisting of a lower alkyl alcohol or dioxane.

BACKGROUND OF THE INVENTION

The present invention relates to new alkylaminoalkyl pentachlorophenyl ethers and to a process for the production of the alkylaminoalkyl pentachlorophenyl ethers in a simple and economic way with a high yield of the desired product by reacting an excess of an alkali metal salt of pentachlorophenol with a hydrohalogenic acid salt of alkylaminoalkyl halide.

It is known that N,N-di-ethylaminoethyl pentachlorophenyl ether may be produced by reacting sodium salt of pentachlorophenol with beta-di-ethylaminoethyl chloride in a solvent consisting of ethyl ether (see the report of D. J. Drain et al. in the "Journal of Chemical Society" (1949), pages 2680–2683).

However, this report did not mention the yield of the product. This method of the prior art is difficult to give a useful high yield of the product and is expensive to be carried out because it needs to proceed an extra step for preparing the starting material beta-di-ethylaminoethyl chloride in the free form from its hydrohalogenic acid salts which are usually available, and because this extra step for preparing the starting material demands the use of expensive reagents and some complicated procedure of recovery of the material.

SUMMARY OF THE INVENTION

It has now been found in accordance with the present invention that new alkylaminoalkyl pentachlorophenyl ethers of the general formula:

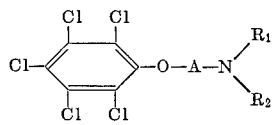

wherein A, $R_1$ and $R_2$ have the same meanings as defined hereinbefore but both of $R_1$ and $R_2$ cannot represent ethyl radical simultaneously, exhibit some useful antimicrobial activity against, for example, Piricularia oryzae, but they are little toxic to fishes. In contrast, we have found that the known beta-di-ethylaminoethyl pentchlorophenyl ether can show a too high toxicity to fishes, though it exhibits antimicrobial activity, so that it cannot be used in agricultural appliction and particularly for control of rice blast in paddy field of rice. However, the new ether compounds according to the present invention may be useful as fungicide for the agricultural applications and particularly for control of rice blast.

It has now been found in accordance with the present invention that it is possible to produce the alkylaminoalkyl pentachlorophenyl ethers in a simple and inexpensive way but with a high yield by reacting an excess of an alkali metal salt of pentachlorophenol with a hydrohalogenic acid salt of an alkylaminoalkyl halide as such without need to perform the previous preparation of the free halide, when lower alkyl alcohol such as methanol, ethanol, propanol, isopropanol, butanol, isobutanol or dioxane and the like is used as the reaction medium.

It is an object of the present invention to provide new alkylaminoalkyl pentachlorophenyl ethers which exhibit usefully high fungicidal activity against pest microorganisms but little toxicity to fishes and which therefore is useful in controlling rice blast in particular.

It is a further object of the present invention to provide an economic process for the production of alkylaminoalkyl pentachlorophenyl ethers which may be carried out in a simple way using an inexpensive compound as the starting materials.

Still further objects and advantages of the present invention will become more apparent from the following more detailed description of the present invention.

According to a feature of the present invention there are provided new alkylaminoalkyl pentachlorophenyl ethers represented by the general formula:

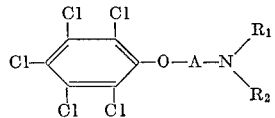

wherein A stands for a chain selected from the group consisting of ethylene, trimethylene and propylene; and $R_1$ and $R_2$ may be the same or different and are selected from the group consisting of alkyl and aralkyl radicals, but both of $R_1$ and $R_2$ cannot represent ethyl radicals simultaneously; and $R_1$ and $R_2$ together with the adjacent nitrogen atom may form a heterocyclic ring selected from the group consisting of pyrrolidine, piperidine and morpholine.

According to a further feature of the present invention there is provided a process for the production of alkylaminoalkyl pentachlorophenyl ethers represented by the general formula:

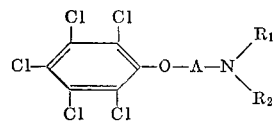

wherein A stands for a chain selected from the group consisting of ethylene, trimethylene and propylene $$-CH-CH_2-$$
$$\quad |$$
$$\;CH_3$$

and $R_1$ and $R_2$ may be the same or different and are selected from the group consisting of alkyl and aralkyl radicals; and $R_1$ and $R_2$ together with the adjacent nitrogen atom may form a heterocyclic ring, which comprises reacting an excess of an alkali metal salt of pentachlorophenol with a hydrohalogenic acid salt of an alkylaminoalkyl halide of the formula:

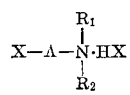

wherein A, $R_1$ and $R_2$ have the same meanings as defined hereinbefore, and X stands for a halogen atom selected from the group consisting of chlorine and bromine, in a solvent which is any of lower alkyl alcohols and dioxane.

DESCRIPTION OF THE PREFERRED EMBODIMENT

When $R_1$ and $R_2$ stand for an alkyl radical in the present invention, they may be a lower alkyl group containing 1 to 4 carbon atoms. When $R_1$ and $R_2$ represent an aralkyl radical, they may preferably be benzyl radical. The heterocyclic ring which $R_1$ and $R_2$ may form together with the adjacent nitrogen atom includes pyrrolidine, piperidine and morpholine rings.

The hydrohalogenic acid salt of alkylaminoalkyl halide which is used as the starting material for the process of the present invention may readily be prepared from the corresponding alkylaminoalcohol.

The new alkylaminoalkyl pentachlorophenyl ethers of the present invention are generally little toxic to fishes and therefore may be suitable for use in controlling diseases of plants and particularly rice blast (*Piricularia oryzae*). This is in marked contrast to the known N,N-diethylaminoethyl pentachlorophenyl ether which is highly toxic to fishes and therefore unsuitable for use in controlling rice blast in paddy field of rice plant.

We have tested some of the new ether compounds of the present invention and the known N,N-di-ethylaminoethyl pentachlorophenyl ether with respect to their toxicity against red killifish by applying in different concentrations as indicated in Table 1 below and estimating percentages of the fishes killed 24 hours and 48 hours after the application of the compound. The results of test obtained are tabulated in Table 1.

TABLE 1.—TOXICITY OF ALKYLAMINOALKYL PENTACHLOROPHENYL ETHERS TO RED KILLIFISH

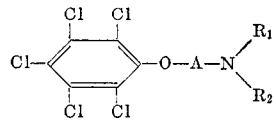

| Chain A | Group $-NR_1R_2$ | Concentration in p.p.m. | Percentages of fish killed after application 24 hours | 48 hours |
|---|---|---|---|---|
| Ethylene | Di-n-butylamino | 1 | 0 | 0 |
|  |  | 5 | 0 | 0 |
| Do | Piperidino | 1 | 0 | 0 |
|  |  | 5 | 0 | 0 |
| Do | Morpholino | 1 | 0 | 0 |
|  |  | 5 | 0 | 0 |
| Do | Pyrrolidino | 1 | 0 | 0 |
|  |  | 5 | 0 | 20 |
| Do | Dibenzylamino | 1 | 0 | 0 |
|  |  | 5 | 0 | 0 |
| Trimethylene | Piperidino | 1 | 0 | 0 |
|  |  | 5 | 0 | 0 |
| Propylene | do | 1 | 0 | 0 |
|  |  | 5 | 0 | 0 |
| Ethylene | Di-ethylamino | 1 | 60 | 90 |
|  |  | 5 | 100 | |

As example of the products which may be produced by the process of the present invention there may be mentioned the following:

Beta-di-n-butylaminoethyl pentachlorophenyl ether
Beta-pyrrolidinoethyl pentachlorophenyl ether
Beta-piperidinoethyl pentachlorophenyl ether
Beta-morpholinoethyl pentachlorophenyl ether
Beta-dibenzylaminoethyl pentachlorophenyl ether
Gamma-dimethylaminopropyl pentachlorophenyl ether, and
Beta-diethylamino-alpha-methylethyl pentachlorophenyl ether The alkylaminoalkyl pentachlorophenyl ethers as produced by the process of the present invention have useful antifungal activity against various pest fungi, for example, *Piricularia oryzae* which is pathogenic to rice blast, so that they are effective in controlling various diseases of plants. These alkylaminoalkyl pentachlorophenyl ethers may be admixed wtih an appropriate inert diluent, either solid or liquid, to form an antifungal composition for agricultural utility. As such diluent, there may be used water, methanol, talc, clay and others which are conventionally employed in the formulation of usual pesticidal compositions.

In accordance with the process of the present invention, an excess of an alkali metal salt of pentachlorophenol is made to react with a hydrohalogenic acid salt of an alkylaminoalkyl halide. This reaction may be promoted by application of heat. It is preferred that at least two molar proportions of the alkali metal salt of pentachlorophenol should be reacted with one molar proportion of the hydrohalogenic acid salt of alkylaminoalkyl halide. When less than two molar proportions of the alkali metal salt are reacted with one molar proportion of the hydrohalogenic acid salt, the yield of the product obtained can be decreased considerably. On the other hand, the yield of the product may reach 85% or more when 2.5 mol. or more of the alkali metal salt is reacted per one mol. of the acid salt.

According to the process of the present invention, a most efficient utilization of the expensive alkylaminoalkyl halide is possible owing to the addition of an excess of the cheaper alkali metal salt, e.g. sodium salt of pentachlorophenol. The amount of the alkali metal salt of pentachlorophenol left unreacted may be recovered from the reaction mixture without difficulty and again re-used for the subsequent processing of fresh charge.

The process of the invention is now illustrated with reference to the following examples which are in no way limitative for the present invention.

EXAMPLE 1

72 grams of sodium salt of pentachlorophenol and 22.8 grams of hydrochloric acid salt of beta-di-n-butylaminoethyl chloride are added to 300 cc. of ethanol and the mixture is heated 3 hours under reflux. The solvent is removed by evaporation under reduced pressure, and to the residue are added 300 cc. of water and 10 grams of sodium hydroxide. The admixture is agitated thoroughly and then extracted with toluene. The extract is distilled to remove toluene, and the residue is dissolved in isopropanol. When the solution is cooled by ice, there are obtained about 35 grams of beta-di-n-butylaminoethyl pentachlorophenyl ether having a melting point of 30 to 31° C.

EXAMPLE 2

72 grams of sodium salt of pentachlorophenol and 18.4 grams of hydrochloride of beta-piperidinoethyl chloride are dissolved in 300 cc. of ethanol and the solution is heated 3 hours under reflux. The solvent is then removed therefrom by evaporation under reduced pressure, and to the residue are added 300 cc. of water and 10 grams of sodium hydroxide. The mixture is then thoroughly agitated, and the crystalline product deposited is filtered off, washed with water and then dried. Recrystallisation from iso-propanol gives about 30 grams of beta-piperidinoethyl pentachlorophenyl ether having a melting point of 69 to 70° C.

EXAMPLE 3

76 grams of potassium salt of pentachlorophenol and 18.6 grams of beta-morpholinoethyl chloride hydrochloride are dissolved in 300 cc. of methanol and the solution is heated for 5 hours under reflux. The solvent is then removed therefrom by evaporation under reduced pressure, and to the residue are added 300 cc. of water and 10 grams of sodium hydroxide. The mixture is agitated and the crystalline product deposited is filtered, washed with water and dried. Recrystallisation from iso-propanol gives about 29 grams of beta-morpholinoethyl pentachlorophenyl ether having a melting point of 89 to 89.5° C.

EXAMPLE 4

72 grams of sodium salt of pentachlorophenol and 29.6 grams of beta-dibenzylaminoethyl chloride hydrochloride are dissolved in 300 cc. of ethanol, and the solution is heated for 4 hours under reflux. The solvent is then removed therefrom by evaporation under reduced pressure, and to the residue are added 300 cc. of water and 10 grams of sodium hydroxide. The resulting mixture is agitated and the crystalline product deposited is filtered off, washed with water and dried. Recrystallisation from iso-propanol gives about 34 grams of beta-dibenzylaminoethyl pentachlorophenyl ether of a melting point of 63 to 64° C.

EXAMPLE 5

36 grams of sodium salt of pentachlorophenol and 7.9 grams of gamma-dimethylaminopropyl chloride hydrochloride as dissolved in 150 cc. of ethanol and the solution is heated for 4 hours under reflux. The solvent is then removed therefrom by evaporation under reduced pressure, and to the residue are added 100 cc. of water and 5 grams of sodium hydroxide. The resulting mixture is agitated and extracted with toluene. The extract in toluene is distilled to remove the toluene. After the residue has been strongly acidified by addition of diluted hydrochloric acid, it is distilled to remove water and the excess of hydrochloric acid. Recrystallisation of the residue from iso-propanol gives about 10 grams of gamma-dimethylaminopropyl pentachlorophenyl ether hydrochloride of a melting point of 196 to 197° C.

EXAMPLE 6

72 grams of sodium salt of pentachlorophenol and 27.3 grams of beta-piperidinoethyl bromide hydrobromide are dissolved in 300 cc. of ethanol and the solution is heated for 3 hours under reflux. The solvent is then removed therefrom by distillation under reduced pressure, and to the residue are added 300 cc. of water and 10 grams of sodium hydroxide. The resulting mixture is agitated and the crystalline product deposited is filtered off, washed with water and dried to give about 34 grams of a crude beta-piperidinoethyl pentachlorophenyl ether. This crude product is dissolved in hot iso-propanol, added with a slight excess of concentrated hydrochloric acid and cooled by ice. There are yielded about 33 grams of the hydrochloride having a melting point of 209 to 210° C. (with decomposition).

EXAMPLE 7

36 grams of sodium salt of pentachlorophenol and 10 grams of 1-di-ethylamino-2-chloropropane hydroxychloride are dissolved in 100 cc. of ethanol and the solution is heated for 3 hours under reflux. The solvent is then removed by distillation under reduced pressure, and to the residue are added 200 cc. of water and 6 grams of sodium hydroxide. The mixture is agitated and then extracted with toluene. The toluene extracted is washed with water and distilled to remove the toluene. There is formed an oily product to which are added 150 cc. of water and 10 cc. of concentrated hydrochloric acid. The mixture is distilled under reduced pressure to remove water. A crystalline product is obtained as the residue. Recrystallisation from iso-propanol gives about 20 grams of beta-di-ethylamino-alpha-methylethyl pentachlorophenyl ether hydrochloride of a melting point of 172.5 to 173.5° C.

EXAMPLE 8

This example demonstrates the fungicidal activity of the alkylaminoalkyl pentachlorophenyl ethers produced by the process of the present invention useful to control the rice blast fungi, together with phytotoxicity to rice plant and toxicity to fish to these ethers.

Solutions containing each of the compounds as indicated in Table 2 below at a concentration of 1% in methanol are prepared.

Rice plants are cultivated in a phytotrone where the environment is so adjusted that the rice blast is likely to occur. When the rice plants which are cultivated in this way and are likely to be infested with the rice blast have grown to five true leaves, such of the above-mentioned solutions is diluted with water to a concentration of the active ingredient as indicated in Table 2 and the diluted solution is sprayed onto the rice plants. After the solution sprayed has been dried, a suspension containing spores of the rice blast fungi (*Piricularia oryzae*) are then sprayed onto the plants for inoculation. This suspension is also applied to the rice plants which are left untreated as the control. When the control rice plants have been infested completely, the number of lesions of infection on leaf is counted. The values of the effect of the tested compounds to control the rice blast are then calculated according to the following equation:

Value of rice blast-controlling effect in percent=

$$\left(1 - \frac{\text{Average number of infection lesions on leaf of treated plant}}{\text{Average number of infection lesions on leaf of untreated plant}}\right) \times 100$$

The test was all made in three replications. Phytotoxicity of the tested compounds to rice plant are estimated with visual observation during the test. An ordinary poisoning test with a killifish is also made and the concentrations of the active compounds at which the percentages of the fish killed reached $LD_{50}$ are estimated. The results of test obtained are tabulated in Table 2 below.

TABLE 2

| Compound tested | Concentration of compound in solution sprayed to plant in p.p.m. | Value of rice blast controlling effect in percent | Phytotoxicity to rice plant | Toxicity to fish (LD$_{50}$) |
|---|---|---|---|---|
| Beta-piperidinoethyl pentachlorophenyl ether | 100 | 83 | — | More than 5 p.p.m. |
|  | 200 | 90 | — |  |
|  | 400 | 97 | — |  |
|  | 600 | 100 | — |  |
| Saccharin salt of beta-piperidinoethyl pentachlorophenyl ether | 400 | 99 | — |  |
| Beta-pyrrolidinoethyl pentachlorophenyl ether | 100 | 70 | — | More than 2.5 p.p.m. |
|  | 200 | 79 | — |  |
|  | 400 | 91 | — |  |
|  | 600 | 96 | — |  |
| Saccharin salt of beta-pyrrolidino-ethyl pentachlorophenyl ether | 400 | 97 | — |  |
| Beta-morpholinoethyl pentachlorophenyl ether | 100 | 87 | — | More than 5 p.p.m. |
|  | 200 | 92 | — |  |
|  | 400 | 99 | — |  |
|  | 600 | 100 | + |  |
| Saccharin salt of beta-morpholinoethyl pentachlorophenyl ether | 400 | 98 | — |  |
| Beta-di-n-butylamino-ethyl pentachlorophenyl ether | 100 | 76 | — | Do. |
|  | 200 | 83 | — |  |
|  | 400 | 97 | — |  |
|  | 600 | 100 | + |  |
| Saccharin salt of beta-di-n-butylethyl pentachlorophenyl ether | 400 | 95 | — |  |

We claim:
1. Beta-N,N-di-n-butylaminoethyl pentachlorophenyl ether.
2. Beta-pyrrolidinoethyl pentachlorophenyl ether.
3. Beta-piperidinoethyl pentachlorophenyl ether.
4. Beta-morpholinoethyl pentachlorophenyl ether.
5. An aminoalkyl pentachlorophenyl ether of the formula

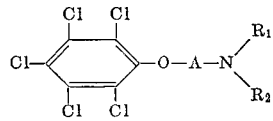

wherein A is an alkylene of 2–3 carbon atoms, $R_1$ and $R_2$ are alkyl of 1–4 carbon atoms or benzyl or together with the adjacent nitrogen atom form pyrrolidino, piperidino or morpholino, provided $R_1$ and $R_2$ are not both ethyl.

6. Beta-dibenzylaminoethyl pentachlorophenyl ether.

References Cited
UNITED STATES PATENTS 3,142,554  7/1964  Godfrey _____ 260—570.7

ALEX MAZEL, Primary Examiner

J. TOVAR, Assistant Examiner

U.S. Cl. X.R.

260—294.7, 326.5, 570.7; 424—248, 267, 274